United States Patent [19]

Fukuda

[11] Patent Number: 4,869,578

[45] Date of Patent: Sep. 26, 1989

[54] GASDYNAMIC PHASE-CONJUGATED MIRROR

[76] Inventor: Robert C. Fukuda, 8424 Richmond Hwy., #96, Alexandria, Va. 22309

[21] Appl. No.: 201,601

[22] Filed: Jun. 1, 1988

[51] Int. Cl.$^4$ .............................................. G02F 1/01
[52] U.S. Cl. .................................................. 350/354
[58] Field of Search .................. 350/353, 354; 372/21, 372/22

[56] References Cited

U.S. PATENT DOCUMENTS 4,529,273 7/1985 Cronin-Golomb et al. ......... 350/354
4,571,954 2/1986 Roberts et al. ...................... 350/354

OTHER PUBLICATIONS

Botor et al., "Generation of 35.5-nm Coherent Radiation", *Optics Letters*, vol. 8, No. 4, Apr. 1983, pp. 217–219.
Kung, "Third-Harmonic Generation in a Pulsed Supersonic Jet of Xenon", *Optics Letters*, vol. 8, No. 1, Jan. 1983, pp. 24–26.
Bogdanoff, "Gasdynamic Lightguide with High Optical Quality", *Applied Optics*, vol. 24, No. 13, Jul. 1985, pp. 2005–2013.

*Primary Examiner*—Eugene R. LaRoche
*Assistant Examiner*—Nathan W. McCutcheon
*Attorney, Agent, or Firm*—Jay M. Cantor

[57] ABSTRACT

A gasdynamic gas flow forms a lightguide wherein an incident coherent light wavefront, such as a laser beam, is reflected to produce a backward-travelling phase conjugated light wavefront. The nonlinear optical phase conjugation process occurs when the incident light intensity is large enough to achieve the intensity threshold required to initiate the phase conjugation process.

17 Claims, 1 Drawing Sheet

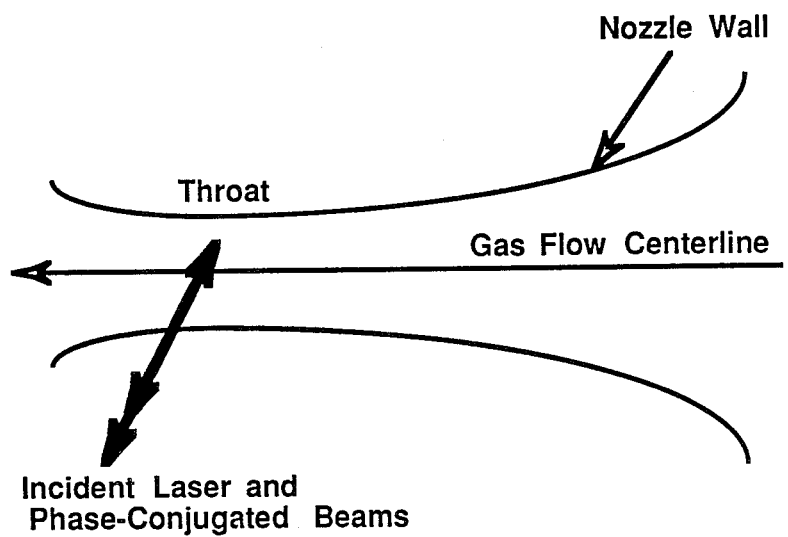

GASDYNAMIC PHASE-CONJUGATED MIRROR

BACKGROUND OF THE INVENTION

1. Field of the Invention

This invention relates optical phase conjugation and, more specifically, to a phase conjugate mirror (PCM) using a gasdynamic gas flow to provide phase correction in a distorted wavefront of a coherent light, i.e., a laser beam.

2. Brief Description of the Prior Art

Phase correction methods are required to improve the laser beam wavefront (sometimes referred to as phasefront), for example, in applications that deliver laser power to a remote target, in atmospheric propagation and in producing a high-brightness and energy laser beam by combining many separate large-aperture, non-uniform intensity laser beams. The improvement in beam wavefront results in higher brightness (power radiated by a point source into unit solid angle) output so that more power is delivered to the target. This brightness is highest ideally for a diffraction-limited beam which has a uniform-spatial-coherent wavefront, and the lowest beam divergence, resulting in minimal beam spreading due to diffraction, in propagation over large distances. The beam's wavefront is usually degraded if the high-quality laser beam propagates through a linear or nonlinear phase aberrating medium (e.g., earth's atmosphere, poor optical quality components, etc.). Distortion correction can occur if it is possible to send a laser beam with a reversed (i.e., negative) phasefront in a direction opposite to that of the incident laser beam through the aberrating medium. This reversal of the phasefront is called phase conjugation (PC), because in the theory of light, the electric field of light is mathematically conjugated to achieve phase reversal.

There are two principal ways to effect phase conjugation in a laser beam: adaptive optics and nonlinear optics. In the adaptive optics approach, a coherent light beam is sent through the aberrating medium, its phasefront is measured, and then this phase information is impressed on the outgoing laser beam via an electro-optical or mechanical deformable mirror. This linear optical approach assumes the aberrations are varying relatively slowly during this phase information transfer process, so that the return phase conjugated beam is wavefront-corrected after propagating the second time through the aberrating medium. Note that there are other possible optical schemes for faster response, high resolution adaptive wavefront estimation and compensation (for example, see the "Adaptive Gas Lens" disclosed by P. J. Goede in U.S. Pat. No. 4,721,370). The other approach is to use a nonlinear optical phase conjugation method to produce the phase conjugated beam. After passing through the aberrating medium, the phase-aberrated light beam impinges on a phase-conjugate mirror (PCM) which reverses the phasefront and reflects the incoming beam to produce the phase conjugate output beam. This PC beam passes through the aberrating medium again, to produce the reverse wavefront, which is, ideally, identical to the incident, undistorted phasefront at that position. This also assumes that the phase distortions do not change significantly during the round-trip time the light beam traverses the aberrating medium. Since PC occurs quite rapidly (an important exception is self-phase-conjugating photorefractive mirrors which respond slowly—on the order of seconds; these PCMs are used with low power continuous-wave lasers) in most instances, this approach is used to reduce beam distortions inside a laser system.

Two approaches are generally used to implement a nonlinear optical PCM: stimulated scattering (SS) and four-wave mixing. In the SS approach, the beam is usually focussed by a lens into an SS cell where exceeding the intensity threshold for stimulated scattering (usually a stimulated Brillouin scattering (SBS) process) results in a phase-conjugated wavefront which then retraces the path through the aberrating medium. The SS approach results in a simple setup for the PCM since the backward-scattered PC process can result from noise amplified by the SS, and therefore requires no extra beams or pump sources to achieve PC. For an SBS process, the backward-travelling PC wavefront is frequency shifted in about 1 part in $1 \times 10^4$ to $1 \times 10^5$ relative to the input beam frequency and is comparable in intensity and beam quality to the incoming laser beam. The SS approach has the disadvantage of requiring an intensity threshold to activate the PCM. This SS intensity threshold can be reduced by increasing the exponential gain factor for SS by increasing the interaction length through which the incident beam travels. The interaction length can be increased by using an SS lightguide cell. The theory to predict SS-PC in an optical waveguide (i.e., lightguide) was first described in "Connection Between the Wavefronts of the Reflected and Exciting Light in Stimulated Mandel'shtam-Brillouin Scattering," by B. Ya. Zel'dovich et al., Vol. 15, pp. 160-164 (1972) (English translation: JETP Letters, Vol. 15, pp. 109-113 (1972)). Since that time, there has been a growing number of experimental and theoretical work performed on PC lightguides.

In four-wave mixing, three input laser beams are combined in a nonlinear medium to produce the phase conjugate beam. Note that one of the three input beams is phase conjugated. The four-wave mixing approach does not require an intensity threshold to be reached to produce the PCM reflection of the input beam, however the requirement for three input beams results in higher system complexity which can be disadvantageous in some applications. Moreover, for high power laser beams, the pump beam quality may not be sufficient for effective phase conjugation. However, for lower power applications, it is possible for power to be transferred from the input pump beams to the phase conjugate beam, producing gain in the intensity of the phase conjugated replica relative to the input beam. For example, Scott and Hazell recently reported PCM reflectivities greater than $1 \times 10^4$ in a stimulated Brillouin-enhanced four-wave mixing setup ("High-Efficiency Scattering in Transient Brillouin-Enhanced Four-wave Mixing," A. M. Scott and M. S. Hazell, IEEE Journal of Quantum Electronics, Vol. QE-22, pp. 1248-1257 (1986)).

The development of high-energy lasers for fusion applications has led to a number of experimental and theoretical studies of suitable nonlinear processes for shortening (i.e., pulse compression) the laser pulsewidth. These studies have shown that gas-phase PC is attractive for high-energy laser applications. Furthermore, gases are less likely to suffer from other competing nonlinear processes (such as self-focussing in liquids), are more resistant to optical damage since gases can withstand very high light intensities, $>2 \times 10^9$ watts per centimeter squared ("Raman Pulse Compression of Excimer Lasers for Application to Laser Fusion," J. R.

Murray et al. IEEE Journal of Quantum Electronics, Vol. QE-15, pp. 342–368 (1979)), and high pressures can be achieved to increase the gain for SS (notably SBS, for PC). However, the high gas pressures, ranging from 10–100 atmospheres, needed for efficient PC, places a constraint on the choice of gas to be used in a particular application. This is due to absorption of laser light, especially in the ultraviolet and infrared spectral region, where most molecular gases absorb appreciably at high pressures.

The initial experiments on gas optics were performed in the 1960s to explore the use of long, narrow gas cells as periodic lens waveguides for communication applications. A vast number of theoretical and experimental studies of gasdynamic supersonic gas flows have been performed for more than the past 35 years, in particular, the application of supersonic jets to produce intense atomic and molecular beams with well-defined density flow fields. There have been experimental results demonstrating the application of a gasdynamic supersonic jet to produce the gasphase, nonlinear medium for the production of vacuum ultraviolet (VUV) coherent light using nonlinear optical harmonic generation. Possible phase conjugation effects were not reported ("Generation of 35.5-nm Coherent Radiation," J. Bokor et al., Optics Letters, Vol. 8, pp. 217–219, (1983); "Third Harmonic Generation in a Pulsed Supersonic Jet of Helium," A. H. Kung, Optics Letters, Vol. 8, pp. 24–26 (1983); A. H. Kung U.S. Pat. No. 4,577,122; and "Pulsed Free Jets: Novel Nonlinear Media for Generation of Vacuum Ultraviolet and Extreme Ultraviolet Radiation," C. T. Rettner et al., Journal of Physical Chemistry, Vol. 88, pp. 4459–4465 (1984)). Also, experimental results have been reported on a high optical quality lightguide produced from a hyperbolic-shaped gasdynamic jet, and good agreement was found between the theoretically-calculated and experimentally-observed shapes of the lightguiding regions ("Gasdynamic Lightguide with High Optical Quality," D. W. Bogdanoff, Applied Optics, Vol. 24, pp. 2005–2013 (1985)).

SUMMARY OF THE INVENTION

In accordance with the present invention, many of the disadvantages of prior art phase conjugate mirrors, especially in high power and energy laser applications, are eliminated. In a high vacuum environment such as in a space environment, there would be no SBS parasitic effects from window scattering ("Simulated Brillouin Scattering Parasitics in Large Optical Windows," J. M. Eggleston and M. J. Kushner, Optics Letters, Vol 12, pp. 410–412 (1987)) or optical damage effects from cell walls ("Measurements of Stimulated Brillouin Scattering Phase-Conjugate Fidelity," P. Suni and J. Falk, Optics Letters, Vol 12, pp. 838–840 (1987), and references cited therein) which could degrade PC wavefront fidelity. Furthermore, since the present invention has no input window, no attenuation of the laser beam intensity can occur due to window absorption, thereby eliminating a beam attenuation problem which could be a serious problem for either infrared or ultraviolet lasers.

The invention is a gasdynamic lightguide which acts as a phase conjugate mirror. A gasdynamic supersonic jet produces a lightguide within the jet. A coherent light wavefront entering this lightguide can be phase conjugated to produce a reflected phase-conjugated beam. By using a gaseous medium, the instant invention operates extremely fast, absorbs little power, requires no external control and is not subject to medium aging or damage. The lightguiding geometry lowers the threshold for initiating phase conjugation so that the instant invention is applicable to coherent light beams which span a wide range of energy/power and wavelength. Furthermore, a long focal length lens can be used to focus the incident light into the lightguide. The lower light intensity and power in the lightguide minimize competing processes such as nonlinear self-focussing and gas breakdown. The possibility of a significant high-intensity-induced index of refraction change, perhaps detrimental to the gasdynamic lightguide, is minimized because there is essentially no medium heating from an SBS process and there is negligible light absorption over many of the laser wavelengths of interest using available high-pressure gases. Depending upon the geometry of the lightguide, this invention is more compact than the analogous conventional gas cell phase conjugate mirror.

BRIEF DESCRIPTION OF THE DRAWING

The FIGURE is a schematic showing of the invention.

DESCRIPTION OF THE PREFERRED EMBODIMENT

The invention is best understood when this description is taken in conjunction with the FIGURE. The inventive phase-conjugated mirror includes a gasdynamic source to produce the lightguiding region. A gasdynamic free jet can be used to form the lightguide. This jet is formed by allowing a high-pressure source gas to flow through an opening (e.g., nozzle or orifice) into a lower pressure region to create a supersonic jet that has no flow-constraining components, such as a skimmer. The variation of gas density in the jet determines the lightguiding properties as well as, possibly, also the SS and PC processes. The lightguide itself is generally formed in the region around the throat of the nozzle and the lightguide axis is perpendicular to the flow axis and the plane of the page, as shown in the drawing. The direction of the incident laser beam is schematically shown in the drawing with a single bold arrow, and the direction of the reflected phase-conjugated beam, which retraces the incident beam, therefore has a direction that is denoted by the double arrow.

The invention operates as follow: A gasdynamic lightguiding region is formed as described above. Then, a coherent light source, i.e., usually a pulsed or continuous wave laser beam, is incident onto the gasdynamic lightguiding region. When the intensity threshold for SS is reached, the SS medium becomes highly reflective, and the reflected wavefront is phase-conjugated by the stimulated scattering medium.

The general requirements of the SS gas medium is that the gas must have a sufficient atomic or molecular density (i.e., number of atoms or molecules per unit volume) to exhibit the SS process and to favor SS over other competing processes. The gas must not condense appreciably at the lightguide's operating pressure and temperature. The gas should have negligible linear and nonlinear absorption at the incident and reflected wavelengths.

The shape of the lightguiding regions is determined by the variation of index of refraction of the gasdynamic jet medium. Since the index of refraction is proportional to the gas density, the variation of gas density determines the lightguide's shape. The gas density is determined by the source pressure, temperature, gas medium properties (e.g., atomic or molecular weight, potential condensation, etc.), the nozzle-shape, etc. In order to lower the SS intensity threshold and improve the fidelity of PC, it is preferable to produce a lightguide with a large length to width ratio. The nozzle shape and geometry of the output nozzle aperture can be varied to produce a desired lightguide geometry. For example, a circular annular lightguide has been made with hyperbolic-shaped nozzle walls on a circular disk ("Gasdynamic Lightguide with High Optical Quality," D. W. Bogdanoff, Applied Optics, Vol. 24, pp. 2005-2013 (1985)). A rectangular lightguide with a long length to width ratio (for lowering SBS thresholds and improving PC fidelity as described hereinabove) can be made from hyperbolic-shaped walls with a nozzle having a rectangular aperture having a long length to width ratio, so the lightguiding region can have a straight-line axis paralleling the lightguide length as implied in the drawing of the invention. Although specific examples of gasdynamic PC lightguides have been provided, it should be understood that these are typical examples, within the scope of the invention. Other examples would be obvious to those skilled in the art.

Moreover, although it is believed that an SS process, usually SBS, is the dominant phenomenon by which the PC occurs, other nonlinear phenomena could be occurring during the operation of the invention.

I claim:

1. A phase-conjugated mirror, including:
   (a) a gasdynamic jet;
   (b) a gas medium in said jet;
   (c) a lightguide region in said jet;
   (d) a coherent light wavefront incident onto said lightguide region;
   (e) means for optically coupling said coherent light wavefront into said lightguide; wherein said lightguide acts as a phase conjugate mirror by undergoing a stimulated scattering, nonlinear optical process when the incident beam is reflected by said lightguide and said light intensity exceeds the threshold for starting said stimulated scattering process.

2. A method of forming a gasdynamic phase-conjugated mirror, comprising the steps of:
   (a) providing a gas jet;
   (b) providing a lightguide region in said jet;
   (c) providing a coherent light wavefront having a light intensity which exceeds the threshold for starting a stimulated scattering process in said lightguide; and
   (d) coupling said coherent light wavefront into said lightguide wherein said lightguide acts as said phase conjugate mirror undergoing a stimulated scattering, nonlinear optical process when the incident beam is reflected by said lightguide.

3. A method as set forth in claim 2 wherein said coherent light is coupled into said lightguide in a direction normal to the path of said gas jet.

4. A method as set forth in claim 2 wherein said gas jet is a gasdynamic jet.

5. A method as set forth in claim 3 wherein said gas jet is a gasdynamic jet.

6. A gasdynamic phase-conjugated mirror, comprising:
   (a) a gas jet;
   (b) a lightguide region in said jet;
   (c) a coherent light wavefront having a light intensity which exceeds the threshold for starting a stimulated scattering process in said lightguide; and
   (d) means to couple said coherent light wavefront into said lightguide wherein said lightguide acts as said phase conjugate mirror undergoing a stimulated scattering, nonlinear optical process when the incident beam is reflected by said lightguide.

7. A mirror as set forth in claim 6 wherein said coherent light is coupled into said lightguide in a direction normal to the path of said gas jet.

8. A mirror as set forth in claim 6 wherein said gas jet is a gasdynamic jet.

9. A mirror as set forth in claim 7 wherein said gas jet is a gasdynamic jet.

10. A mirror as set forth in claim 6, further including means to form said gas jet comprising an orifice, means to provide a high pressure gas at one end of said orifice and means to provide a relatively lower pressure region at the other end of said orifice.

11. A mirror as set forth in claim 7, further including means to form said gas jet comprising an orifice, means to provide a high pressure gas at one end of said orifice and means to provide a relatively lower pressure region at the other end of said orifice.

12. A mirror as set forth in claim 8, further including means to form said gas jet comprising an orifice, means to provide a high pressure gas at one end of said orifice and means to provide a relatively lower pressure region at the other end of said orifice.

13. A mirror as set forth in claim 9, further including means to form said gas jet comprising an orifice, means to provide a high pressure gas at one end of said orifice and means to provide a relatively lower pressure region at the other end of said orifice.

14. A method as set forth in claim 2, further including forming said gas jet by providing an orifice, providing a high pressure gas at one end of said orifice and providing a relatively lower pressure region at the other end of said orifice.

15. A method as set forth in claim 3, further including forming said gas jet by providing an orifice, providing a high pressure gas at one end of said orifice and providing a relatively lower pressure region at the other end of said orifice.

16. A method as set forth in claim 4, further including forming said gas jet by providing an orifice, providing a high pressure gas at one end of said orifice and providing a relatively lower pressure region at the other end of said orifice.

17. A method as set forth in claim 5, further including forming said gas jet by providing an orifice, providing a high pressure gas at one end of said orifice and providing a relatively lower pressure region at the other end of said orifice.

* * * * *